United States Patent [19]
Augenbraun et al.

[11] Patent Number: 5,654,759
[45] Date of Patent: Aug. 5, 1997

[54] METHODS AND APPARATUS FOR REDUCING BLOCKINESS IN DECODED VIDEO

[75] Inventors: Joseph E. Augenbraun, Princeton; Jill MacDonald Boyce, Manalapan, both of N.J.

[73] Assignee: Hitachi America Ltd., Tarrytown, N.Y.

[21] Appl. No.: 388,769

[22] Filed: Feb. 15, 1995

[51] Int. Cl.$^6$ .................................................. H04N 17/18
[52] U.S. Cl. ........................ 348/405; 348/415; 348/416; 348/420; 348/421
[58] Field of Search ................................. 348/405, 406, 348/409, 411, 416, 419, 420, 699, 404, 384

[56] References Cited

U.S. PATENT DOCUMENTS

| | | | |
|---|---|---|---|
| 5,023,710 | 6/1991 | Kondo et al. | |
| 5,367,629 | 11/1994 | Chu et al. | 395/162 |
| 5,432,615 | 7/1995 | Watanabe | 348/420 |
| 5,440,346 | 8/1995 | Alattar et al. | 348/420 |
| 5,442,407 | 8/1995 | Iu | 348/420 |
| 5,453,789 | 9/1995 | Machida et al. | 348/420 |
| 5,473,384 | 12/1995 | Jayant et al. | 348/470 |
| 5,495,538 | 2/1996 | Fan | 382/233 |
| 5,512,956 | 4/1996 | Yan | 348/406 |
| 5,563,718 | 10/1996 | Wober et al. | 358/432 |

OTHER PUBLICATIONS

T. Jarske, P. Haavisto, I. Defe'e, IEEE Transactions on consumer Electronics, "Post–Filtering Methods For Reducing Blocking Effects From Coded Images"; vol. 40, No. 3, pp. 521–526, Aug. 1994.

T. Jarske, P. Haavisto, I. Defe'e, IEEE Digest of Technical Paper, WPM 13.2, pp. 218–219; "Post–Filtering Methods For Reducing Blocking Effects From Coded Images", (Jun. 21–23, 1994).

Y. Hsu, Y. Chen, IEEE Transactions on Consumer Electronics, "A New Adaptive Separable Median Filter For Removing Blocking Effects", vol. 39, No. 3, pp. 510–513, Aug. 1993.

International Standards Organization—Moving Picture Experts Group, Drafts of Recommendation H.262, ISO/IEC 13818–1, Nov. 1993.

International Standards Organization—Moving Picture Experts Group, Drafts of Recommendation H.262, ISO/IEC 13818–2, Nov. 1993.

United States Advanced Television Systems Committee, Guide to the Use of Digital Television Standard For HDTV Transmission, Apr. 12, 1995.

*Primary Examiner*—Tommy P. Chin
*Assistant Examiner*—Anand Rao
*Attorney, Agent, or Firm*—Michaelson & Wallace; Michael P. Straub; Peter L. Michaelson

[57] ABSTRACT

Methods and apparatus directed to reducing blockiness resulting from encoding digital video data using, e.g., DCTs are disclosed. An encoder which encodes video signals into a digital video bitstream including information identifying blocky video and instructions for processing the blocky video is also disclosed. A plurality of methods of identifying blocky video in an encoded bitstream by analyzing the encoded bitstream are also disclosed. In addition, various methods of filtering both non-blocky and blocky video, without adversely affecting the non-blocky video, are described.

14 Claims, 4 Drawing Sheets though most methods have the unfortunate effect of reducing the quality of video images that are not blocky when the blockiness reduction methods are applied to such images.

Accordingly, there is a need for methods of identifying video images which would benefit from the application of processing to decrease blockiness and for improved methods of reducing the effects of blocking artifacts, e.g., of reducing the blockiness of video images without negatively affecting the quality of non-blocky video images.

METHODS AND APPARATUS FOR REDUCING BLOCKINESS IN DECODED VIDEO

FIELD OF THE INVENTION

The present invention is directed to methods and apparatus for improving the perceived quality of decoded video images by identifying video data with blocking artifacts and reducing and/or compensating for the blocking artifacts.

BACKGROUND OF THE INVENTION

For various reasons, including quality issues, the representation of video images in digital form for, e.g., television and other video purposes, is gaining in popularity.

In order to reduce the amount of data required to represent one or more video images in digital form, the use of coding methods which provide for data compression are becoming common place.

Many video coding standards and systems use Discrete Cosine Transform (DCT) coding methods. The MPEG-2 standard that is described in the International Standards Organization—Moving Picture Experts Group, Drafts of Recommendation H.262, ISO/IEC 13818-1 and 13818-2 titled "Information Technology—Generic Coding Of Moving Pictures and Associated Audio" (hereinafter "the November 1993 ISO-MPEG Committee draft"), which is hereby expressly incorporated by reference, is one such standard. References in this application to blocks, macroblocks, P-frames, B-frames and I-frames, unless indicated otherwise, are to be interpreted in a manner that is consistent with the use of the same terms in the MPEG-2 standard referred to above.

While DCT coding and other digital coding methods offer the ability to greatly compress video data, the video images which are generated after using such coding techniques often suffer from some visual artifacts which are the result of the coding process.

One of the most annoying artifacts is referred to as a blocking or blocky artifact. This undesirable artifact derives its name from the fact that it results from the processing of portions of video images in blocks, e.g., 8×8 blocks of pixels.

The MPEG standard provides for coding of video images using, among other things, DCT coding. With regard to MPEG coding, fades in video often lead to blocky artifacts which result in a blocky picture because MPEG prediction does not represent fades well. Each frame within the fade portion can not be well predicted from the frame before, so it is as if every frame or image in a scene changes for as long as the fading lasts. Unlike scene changes in a fade, a viewer's eyes can follow the fading images and blocks are noticeable.

Because of data constraints associated with television broadcasts, it is expected that MPEG video used for television will generally not be allocated enough bits to code many sequential frames independently requiring data compression that will result in a noticeable degree of blockiness in the case of fades.

In addition to generating blocky images when video fades are present, MPEG coding also results in blocky images when the frames or images include non-translational motion or large amounts of motion beyond the searched motion vector region. This is because MPEG motion compensated prediction is a poor model for such types of motion.

While various methods of filtering of coded video images have been suggested for reducing the effects of blockiness,

SUMMARY OF THE INVENTION

The present invention provides for methods and apparatus for determining and/or indicating when blockiness reduction techniques should be applied to encoded video images.

In accordance with one embodiment of the present invention, an encoder detects when the video data being encoded will result in blocky video images. The encoder incorporates information identifying the encoded data that will result in blocky video images into the encoded video bitstream generated by the encoder. In addition, the encoder may include in the encoded video bitstream instructions for processing the blocky video data to reduce the blockiness of the images generated from the encoded video data. The information identifying the blocky video data and specific instructions for processing such blocky video data may be included in, e.g., MPEG transport headers.

In another embodiment of the present invention, a decoder incorporates a circuit for detecting encoded video data that will produce blocky video images. The blockiness identification circuit does this by monitoring a received encoded video bitstream for one or more indica of blocky video data. One of these is the information identifying data corresponding to blocky images that is generated by the encoder of the present invention. Other indica which may be used to detect encoded video data corresponding to blocky video images include high quantization scale factors, large numbers of intra coded macroblocks in predictively coded and/or bi-directionally coded video frames, large motion vectors and/or a cost function which is determined using pixel differences at block boundaries. The video encoder of the present invention may use the same or similar indica of blocky video images to identify encoded data generated by the encoder that will result in blocky video images.

In accordance with the present invention video data that is identified as likely to produce blocky images is processed, e.g., by using a Gaussian low pass filter, by filtering at just the block boundaries or by adjusting IDCT coefficients to minimize a blockiness cost function used to estimate the impact blockiness will have on the quality of the image which will be generated from the blocky video data. To avoid reducing the quality of images produced from non-blocky video data, such blockiness reduction operations are limited to the video data identified as corresponding to blocky video images.

The present invention is also directed to various filtering methods for reducing the blockiness of video data which operate as a function of the slew rate of the luminance and/or chrominance components of a block. These filtering methods can be applied to video data corresponding to blocky and non-blocky images with little or no adverse impact on the non-blocky video images.

DETAILED DESCRIPTION

The present invention provides for methods and apparatus for indicating and/or determining when blockiness reduction techniques should be applied to encoded video images. It also provides for various methods of reducing the blockiness of encoded video images.

As discussed above, it is possible to improve the perceived image quality of blocky video by applying blockiness reduction techniques to blocky video images. However, while applying blockiness reduction techniques, such as low pass filtering to blocky video images can increase the perceived quality of such images, it can have the undesirable side effect of reducing the resolution and/or detail of non-blocky video images. In accordance with various embodiments of the present invention, blocky video images or portions thereof are identified and blockiness reduction techniques are applied only to the identified images or blocky portions.

In accordance with one embodiment of the present invention, prior to broadcasting MPEG video, an encoder, such as the encoder 10 of the present invention and/or a video editor used to generate or process video being encoded, is used to monitor the video being encoded to detect, e.g., scene changes, fades, non-translational motion, large amounts of motion and other video changes or features that result in the coded video images appearing blocky. Upon detecting such video conditions, by, e.g., using the blockiness identification circuit 32, the encoder 10 or video editor, inserts information into the coded bitstream identifying the blocky video data and/or instructions regarding video data processing that should be performed by a decoder to improve the quality of the images generated from the video data output by the encoder 10. Accordingly, the information included in the encoded video bitstream can be used by, e.g., a decoder when decoding the encoded video data, to determine which video frame or images are likely to be blocky and therefore should be processed to reduce blockiness.

Figure 1:
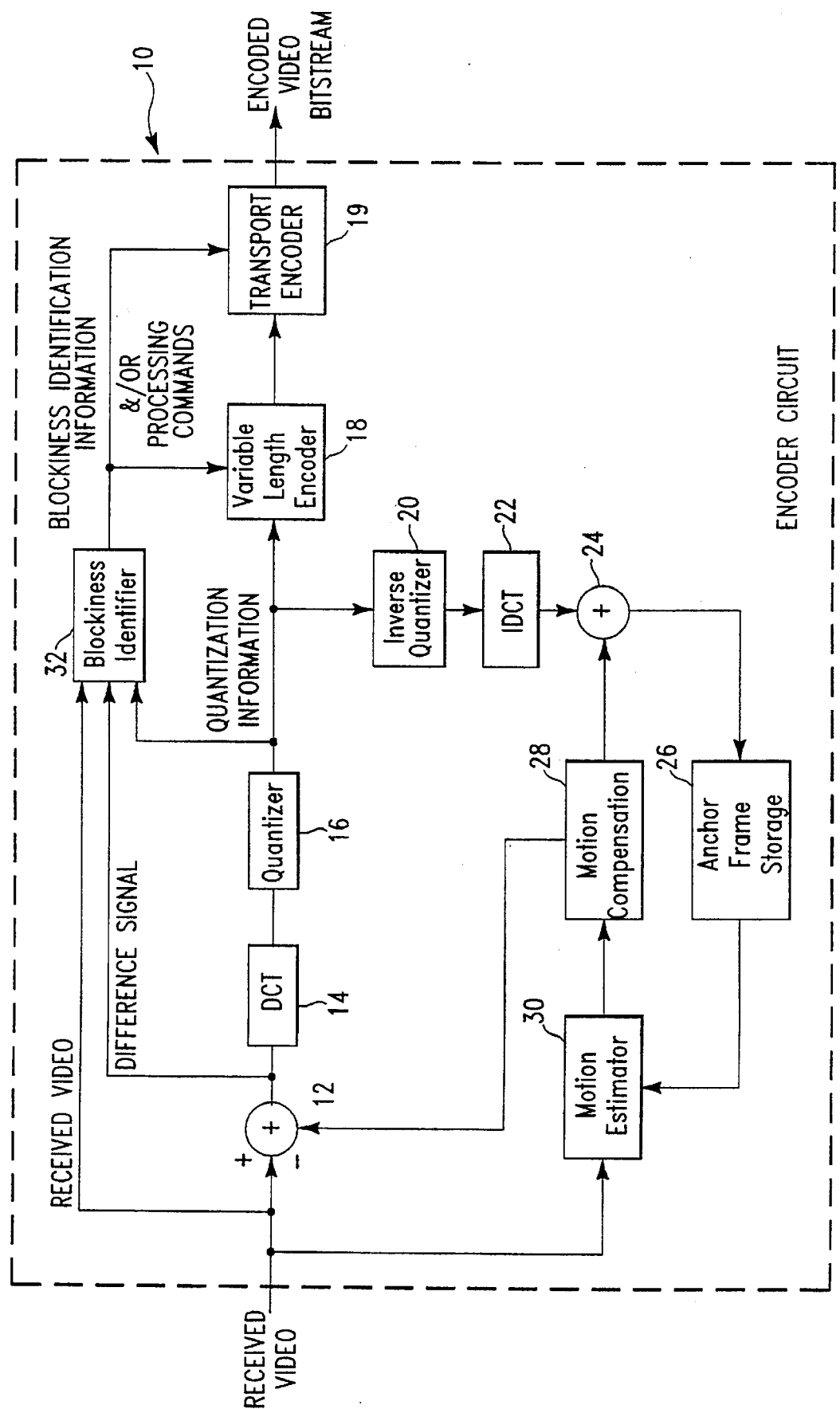
FIG. 1 is a schematic block diagram of a video encoder and blockiness identification circuit implemented in accordance with the present invention.

Referring now to the drawings, and initially to FIG. 1, there is illustrated a video encoder implemented in accordance with the present invention generally indicated by the reference numeral 10. The video encoder 10 comprises a first summer 12, a discrete cosine transform ("DCT") circuit 14, a quantizer circuit 16, a variable length encoder 18, a transport encoder 19, an inverse quantizer 20, an inverse DCT ("IDCT") circuit 22, a second summer 24, a motion compensation circuit 28, an anchor frame storage circuit 26 and a motion estimator 30 coupled together in the manner illustrated in FIG. 1.

In addition, the video encoder 10, includes a blockiness identification circuit 32 coupled to, e.g., a video input terminal of the encoder circuit 10 and/or transport encoder 19, the output of the first summer 12 and to the output of the quantizer 16. Thus, the blockiness identification circuit 32 receives the video signal supplied to the encoder 10, quantization information output by the quantizer 16 and motion compensation information. The blockiness identification circuit 32 monitors the signals received via its inputs to detect, e.g., the conditions discussed above which result in block video images. In accordance with the present invention, in some embodiments, the blockiness identification circuit 32 does this in a manner that is the same as, or similar to, the way in which a blockiness identification circuit 202 of the present invention detects blocky images or frames in an encoded bitstream.

However, it should be noted that because the original video images being encoded are available to the encoder it is easier for the encoder 10 to identify scene changes and fades than it is for the decoder 200. Furthermore, because it has more information available than does the decoder it can perform blockiness identification techniques that could not, or are not, performed by the decoder 200.

It is also worthwhile to note that because a single encoder is used to encode a video image being broadcast to multiple receivers, the cost of encoder circuitry, from a commercial standpoint, is much less important than the cost of decoder circuitry which directly effects, e.g., the cost of television receivers. Accordingly, it is economically feasible to implement relatively costly blockiness identification methods in an encoder where is would not be economically feasible to implement such techniques in a decoder.

In one embodiment, the blockiness identification circuit 32 of the encoder 10 identifies blocky video by comparing the absolute error between an original frame and the coded frame by comparing pixels along block boundaries of the original frame with pixels in the centers of blocks of the coded frame. If the absolute error is significantly larger along block boundaries than in the centers of blocks, the data representing the encoded video frame is identified as corresponding to a blocky video frame.

The comparison operation implemented by the blockiness identification circuit 32, in such an embodiment, may be represented by the following comparison:

$$\sum_{\substack{\text{pixels} \\ \text{in block} \\ \text{boundary}}} |Orig(X,Y) - Coded(X,Y)| > $$

$$THRESHOLD + \sum_{\substack{\text{pixels} \\ \text{in block} \\ \text{center}}} |Orig(X,Y) - Coded(X,Y)|$$

where (X,Y) are pixel positions;

where Orig is the original frame; and where Coded is the coded frame generated by the encoder 10.

The output of the blockiness identification circuit 32 of the present invention, which indicates the detection of conditions that are likely to result in block video, is coupled to an input of the variable length encoder 18 and/or transport encoder 19. The variable length encoder 18 is responsible for including in the encoded video bitstream generated by the encoder circuit 10 information about the blockiness of the encoded video images and/or instructions for processing the blocky video images upon decoding.

MPEG syntax allows a number of places in an MPEG compliant bitstream into which such information can be inserted. For example, there are spaces available in transport headers, and in picture and/or slice user IDs, which can be used for transmitting information about the blockiness of the encoded video data. The variable length encoder 18 can be used to insert the blockiness identification information into the slice user IDs while the transport encoder 19 can be used to insert the blockiness identification information into transport headers.

While MPEG syntax allows users to insert information into the bitstream in the places discussed above, it does not provide a syntax for inserting such information. Accordingly, it is important to define a syntax for including information about the blockiness of video images that can be generated by an encoder 10 and understood by a decoder.

In the simplest case, a single bit can be used, e.g., at specific locations in a transport header, to indicate if the video image represented by the data associated with the transport header will be blocky as a result of the data compression performed by the encoder 10. A decoder circuit, such as the decoder circuit 200 of the present invention, receiving such information can then selectively apply blockiness reduction techniques to the video data representing images which are identified by the encoder 10 as being blocky without applying the techniques to non-blocky video images.

As discussed above, in accordance with one embodiment of the present invention, the variable length encoder 18, not only identifies blocky video images by inserting identification information into the generated bitstream, but also includes in the bitstream instructions on how to post-process the encoded video data upon decoding to provide good image quality. A variety of post-processing instructions could be included by the variable length encoder 18, including instructions to use various filter weights in, e.g., low pass filters used to process the video data after decoding. The syntax for such instructions is, in accordance with the present invention, standardized between the video encoder 10 and the decoder circuit 200 with the instructions being placed in the generated video bitstream in, e.g., the various places allowed by the MPEG syntax which are discussed above.

Because the encoder 10 receives the original video images in an uncompressed state and because it has information about the amount and type of data compression performed on the received uncompressed video images, the encoder 10 can make a relatively accurate determination as to when images or video frames generated from the encoded video data are likely to be blocky as a result of the encoding process.

Thus, by having the encoder 10 incorporate blockiness information and/or processing instructions into the encoded bitstream generated by the encoder 10, in the above described manner, a decoder circuit 200 is provided with a good indication of what images or frames are likely to be blocky and what processing should be performed to improve image quality.

When an encoder does not incorporate blockiness information and/or blockiness reduction processing instructions into an encoded bitstream, it is desirable for a decoder circuit 200 receiving the encoded bitstream to analyze the encoded bitstream and determine which video images or frames are likely to be blocky. After making such a determination, the video data, blocks, corresponding to video images or frames which are likely to be blocky, are processed using one or more blockiness reduction techniques while the video data which corresponds to non-blocky video images or frames is output after decoding without performing such blockiness reduction operations thereon.

Figure 2:
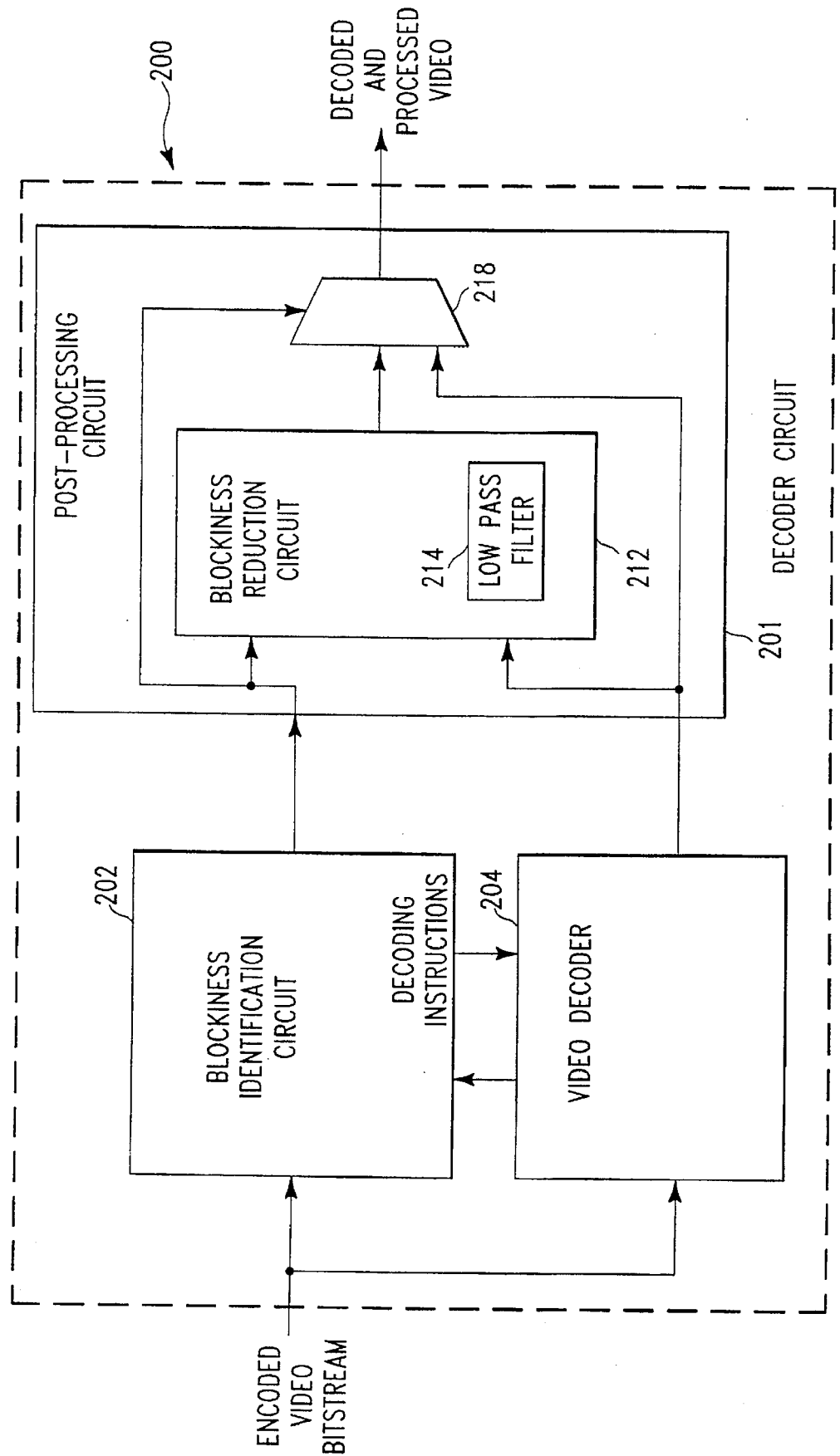
FIG. 2 is a schematic block diagram of a video decoder including a blockiness identification circuit implemented in accordance with the present invention.
Figure 3:
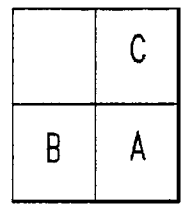
FIG. 3 illustrates a plurality of four adjacent blocks.

Referring now to FIG. 2, the decoder circuit 200 of the present invention is illustrated in block diagram form. The decoder circuit 200 comprises a blockiness identification circuit 202 and a video decoder 204 which receive as their inputs the encoded video bitstream supplied to the decoder circuit 200. Outputs of the blockiness identification circuit 202 and the video decoder 204 are coupled to first and second inputs of a post-processing circuit 206. The post processing circuit 206 is responsible for performing blockiness reduction operations on the decoded video data received from the video decoder 204 when required.

The post-processing circuit 206 includes a multiplexer 218, and a blockiness reduction circuit 212. The blockiness reduction circuit 212 has a first input coupled to the output of the blockiness identification circuit 202 and a second input coupled to the output of the video decoder 204. The blockiness reduction circuit 212 which includes circuitry, e.g., a low pass filter 214, for implementing various blockiness reduction operations, is responsive to instructions, if any, received from the blockiness identification circuit 202 to perform one or more blockiness reduction operations on the video data received from the video decoder 204. Data that is not identified as corresponding to blocky video images or frames need not be processed by the blockiness reduction circuit 212.

The output of the blockiness reduction circuit 212 is coupled to a first input of the MUX 218 while the output of the video decoder 204 is coupled to a second input of the MUX 218. The decoded video data supplied to the second input of the MUX 218 may be delayed using a storage element so that it remains in sync with the video data being processed by the blockiness reduction circuit 212.

A control signal input of the MUX 218 is coupled to the output of the blockiness identification circuit 202. In this manner, the blockiness identification circuit 202 controls the MUX 218 to output either the decoded video data supplied by the video decoder 204 or the decoded and processed video data supplied by the blockiness reduction circuit 212. The output of the MUX 218 represents a decoded video data stream that can be supplied to e.g., a display device.

When the blockiness identification circuit detects blocky data it controls the MUX so that the data output by the blockiness reduction circuit 212 is selected for inclusion in the decoded and processed video data stream output by the post-processing circuit 206. Otherwise, the MUX 206 outputs the video data supplied by the video decoder 204.

Thus, under the control of the blockiness identification circuit 202 blockiness reduction operations are selectively performed on video data likely to produce blocky video images while video data that does not correspond to blocky images are output without blockiness reduction operations being performed thereon.

The blockiness reduction circuit 212 is responsive to processing instructions, if any, received from the blockiness identification circuit 202.

Accordingly, the blockiness identification circuit 202 in the decoder circuit 200 is responsible for controlling upon which data blockiness reduction operations are performed.

In accordance with one embodiment of the present invention, the blockiness identification circuit 202 monitors the received encoded video data for information incorporated by the encoder 10, into the encoded video bitstream, identifying blocky video and/or instructing the decoder circuit 200 on the post-processing operations that should be performed on the video data upon decoding. This information is then used to control the blockiness reduction circuit 212 and the MUX 218.

In another embodiment, the blockiness identification circuit 202 monitors the encoded video bitstream for information, e.g., information which is not available after decoding, that is useful for determining if received encoded video data will result in the generation of blocky images or frames. The monitoring process may include monitoring of, e.g., quantization scale factors, motion vector information, or other information which can be obtained from MPEG coding elements included in the encoded bitstream and/or from the decoded video data output by the decoder 204.

The blockiness identification circuit 202 makes determinations as to which of the received video data will result in blocky video images. This determination is based on one or more factors including high quantization scale factors, the presence of a large number of intra-coded macroblocks in a predictively coded (P-) frame or a bi-directionally coded (B-) frame and/or the presence of large motion vectors in the encoded data representing a video image or frame. For example, in one embodiment when the blockiness identification circuit 202 detects quantization scale factors in excess of a preselected level, e.g., 8 or higher on a scale of 2 to 32 for encoded MPEG video data, the data is identified as corresponding to a blocky video image.

In another embodiment, when the blockiness identification circuit 202 detects that 15% or more of the macroblocks corresponding to a P- or B- frame are intra-coded, the blockiness identification circuit 202 identifies the encoded data corresponding to the frame as corresponding to a blocky frame. Higher percentages of intra-coded macroblocks in P- and/or P- frames, e.g., percentages in excess of 50%, may be interpreted as corresponding to video fades which, in some embodiments of the present invention are detected and identified as a specific blocky condition.

In one embodiment of the present invention motion vectors corresponding to a section of a video frame, e.g., a macroblock or multiple macroblocks corresponding to, e.g., ¼ or less of a frame, are compared to motion vectors in the rest of the frame. In such an embodiment, if motion vectors corresponding to the portion of the frame are significantly larger, e.g., larger by a difference of 16 or more, than the motion vectors corresponding to the rest of the frame, the section of the frame is considered to be blocky.

In yet another embodiment, when large motion vectors, e.g., motion vectors of 16 or larger, are detected, the blockiness identification circuit 202 identifies the 10 frame or image to which the large motion vectors correspond as a blocky frame or image.

In yet another embodiment, intra-coded (I-) frames, and P- and B- frames with several contiguous intra coded macroblocks are declared blocky if large differences, e.g., differences of 10 or more, in DC DCT values exist. Note that in MPEG, in the case of contiguous intra coded macroblocks, the differences in DC DCT values and not the absolute DC DCT values are coded.

It is also possible for the blockiness identification circuit 202 to identify blocky video by monitoring which and how many AC DCT coefficients are transmitted as part of the encoded data used to represent a video frame.

In yet another embodiment, a cost function is defined and used by the blockiness identification circuit 202 to identify video data corresponding to blocky frames or images.

A simple cost function which can be implemented by the blockiness identification circuit 282 is to add the absolute differences of all pixels in neighboring blocks. To simplify the calculation of the cost function, it is possible to use the pixels from the left and/or upper edges of the blocks instead of the right and lower edges. This simplifies the calculation process because the left and upper macroblocks are normally decoded and processed before the right and lower macroblocks. Thus, the video decoder 204, which is coupled to the blockiness identification circuit 202, can readily supply data corresponding to the left and/or upper edges of blocks to the blockiness identification circuit 202 before it can supply similar data for the right and lower edges.

The cost function can be expressed by the following formula:

$$\text{Cost} = \sum_{Y=0}^{7} |A(0,Y) - B(7,Y)| + \sum_{X=0}^{7} |A(X,0) - C(X,7)|$$

Where A(i,j) refers to the (i,j) pixel in the array of 8×8 pixels which comprise block A and where the pixels of the B and C blocks are refered to using the same notation.

In accordance with the present invention, if the cost function exceeds a predetermined threshold, e.g, the value 128, the blockiness identification circuit 202 will identify the image or frame to which the data used to calculate the cost function corresponds as being blocky.

Once data corresponding to blocky video images or frames is identified, e.g., by the blockiness identification circuit 202, the blockiness reduction circuit 212 is controlled to perform blockiness reduction operations on the identified blocky video data.

In accordance with one embodiment of the present invention, which identifies blocky video using the above described cost function, blockiness is reduced on a block by block basis under the control of the blockiness identification circuit 202 by adjusting the quanitized DCT coefficients corresponding to a block of a video frame, within the block's quantizer range to minimize the cost function.

For example, if the quantizer step size is 4, all values between 2–6 are quantized to 4. The blockiness identification circuit 202 can also control the video decoder circuit 204 to try other values in the range to minimize the cost function. There are 8×8 DCT coefficients in each block. When adjusting the quanitized DCT coefficients a suitable starting point is the DC DCT coefficient. After adjusting the quantization value of the DC DCT coefficient, the 1st AC DCT coefficient in zig zag scan order is adjusted, then the 2nd AC DCT coefficient and so on. All 64 DCT coefficients can, but need not, be adjusted. The zero-valued coefficients that are hidden by run length codes can also be adjusted in accordance with the present invention to reduce blockiness.

Figure 4:
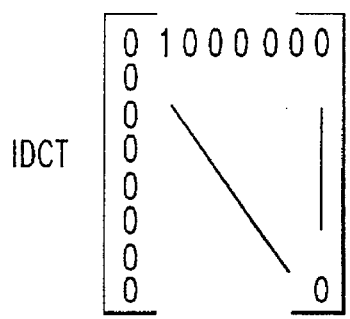
FIG. 4 is a diagram representing the value generated by taking the inverse discrete cosine transform ("IDCT") of an 8×8 matrix of DCT coefficients representing a block where all DCT coefficients have a value of zero except for a single indicated DCT coefficient.

For each adjusted value of each DCT coefficient, an inverse DCT and inverse prediction operation must be performed by the video decoder 204 to permit the blockiness identification circuit 202 to compute the cost function. The computation for this can be simplified because the IDCT is a single linear function, so that for any scaling factor $\propto$, the IDCT(x+$\propto$Y)=IDCT(x)+$\propto$IDCT(y). The inverse DCT for each 8×8 matrix with a 1 in a position and 0 in all other positions is pre-computed and stored in the blockiness identification circuit 202 or video decoder 204. The stored values are then used to compute the effect of adjusting the DCT coefficient values, e.g., of adjusting the 1st AC DCT coefficient value of a block from 4 to 2. For example, calculating the IDCT resulting from adjusting the first AC DCT coefficient from 4 to 2 could be implemented by adding −2 times the IDCT of the 8×8 matrix illustrated in FIG. 4 and then adding this value to the previously predicted inverse DCT values for the block that is being adjusted since the previously predicted inverse DCT values are also a linear function.

When the blockiness identification circuit 202 operates in the above described manner, with the video decoder 204, to reduce the blockiness of blocky video images, the post-processing circuit 206 is not required.

In addition to adjusting the quantized DCT coefficients to reduce blockiness, or as an alternative method of reducing blockiness, a low pass filter may be used. Accordingly, as illustrated in FIG. 2, in one embodiment, the blockiness reduction circuit 212 includes a low pass filter, e.g., a Gaussian low pass filter.

The amount of low pass filtering may be controlled by the blockiness identification circuit 202 by, e.g, supplying commands or instructions to the blockiness reduction circuit regarding the filter weights to be used when processing the decoded video data. In cases of extreme blockiness, large extent filters, e.g., 7×7 filters, should be used. When a fade is identified, a very strong low pass filter should be applied. As a fade ends and the amount of blockiness decreases, the amount of low pass filtering is reduced gradually under the control of the blockiness identification circuit 202 so that a viewer doesn't notice a jump from fuzzy to sharp images.

In another embodiment of the present invention, the low pass filter 214 is used to selectively low pass filter only the pixels on the edges of blocks. In the case of P- and B- frames, where blocking effects occur at places other than, in addition to, the edges of blocks, the blockiness identification circuit 202 analyzes the bitstream and motion vectors included therein to determine the blocky boundaries and then proceeds to control the low pass filter 214 so that the pixels on the edges of the blocks and the identified blocky boundaries within the P- and B- frames are selectively filtered.

In an attempt to limit the adverse impact of the above described blockiness reduction techniques, the present invention limits their application to the processing of video data which has been identified as corresponding to blocky video frames or images.

Various embodiments of the present invention, which are directed to filters that don't require the identification of blocky video because they have little or no adverse impact on non-blocky video will now be discussed.

Some of the magnitude transitions in the luminance and chrominance components of decoded signals are representative of the source image. However, others are high frequency artifacts that result from quantization effects. In accordance with the present invention, filters can be constructed that differentiate between these two cases by using information included in the encoded bitstream received by a decoder circuit.

Figure 5:
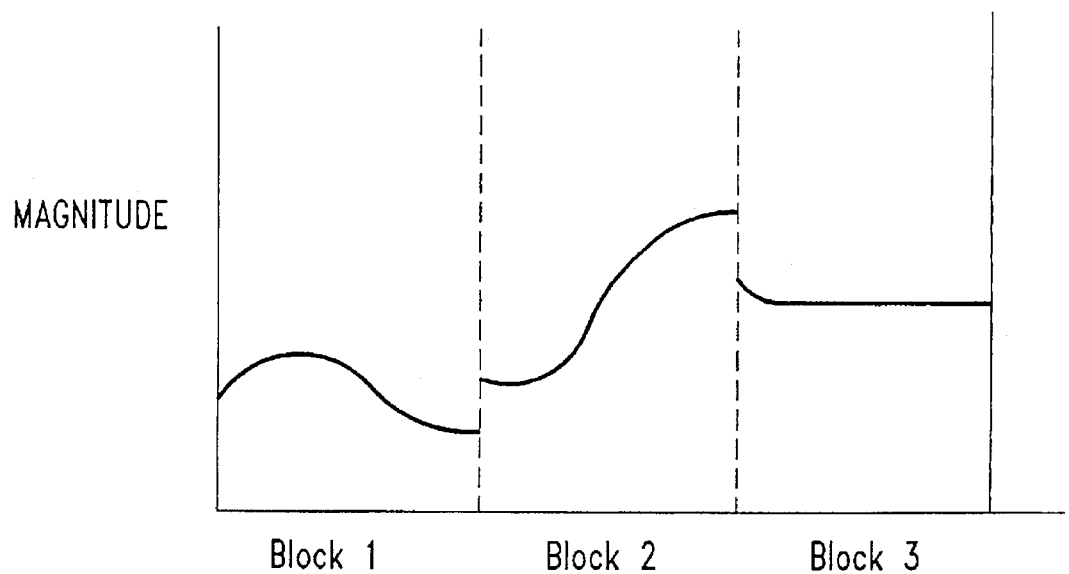
FIG. 5 is a diagram illustrating the magnitude transitions in the luminance component of a decoded video signal generated by decoding data corresponding to a single line of pixels from three exemplary consecutive luminance blocks.

Referring now to FIG. 5, there is illustrated a graph that represents the luminance signal generated from one video line of three exemplary consecutive decoded video blocks, Block 1, Block 2, and Block 3. Note that there are discontinuities at the block boundaries.

While it is possible that the original image was similar to this decoded image in having discontinuities at the block boundaries, it is more likely that the original image was continuous and that the data compression which occurred during the encoding process resulted in the discontinuity or blockiness artifact.

In accordance with MPEG and other DCT based encoding algorithms, each block is represented by a group of IDCT coefficients of various frequencies. Quantization results in a number of higher order AC DCT coefficients being set to the value of zero during the encoding process. Any decoded image that has block transitions with slew rates, i.e., transitions in the slope of the magnitude of the luminance component, higher than those exhibited within the neighboring block or blocks is likely to be perceived as blocky.

The present invention provides three different filtering methods which are based on the slew rate of the luminance and/or chrominance components of a block.

The first of the three filtering methods provides for the detection of the maximum slew rate within each decoded block e.g., by measuring the slew rate of the decoded video signal. If the transition region between two consecutive blocks exceeds the magnitude of the maximum slew rate in either block, the rate of the transition edge is slowed down to stay within the magnitude of the maximum slew rate of the block which is having its slew rate altered. The line that is used by a filter in accordance with the present invention to connect the discontinuous transition regions may be contained entirely within either block or may span the two blocks. In accordance with the present invention, this alteration of the slew rate is done separately for luma and chroma, and may be performed horizontally, vertically, horizontally and vertically, or two-dimensional.

Figure 6:
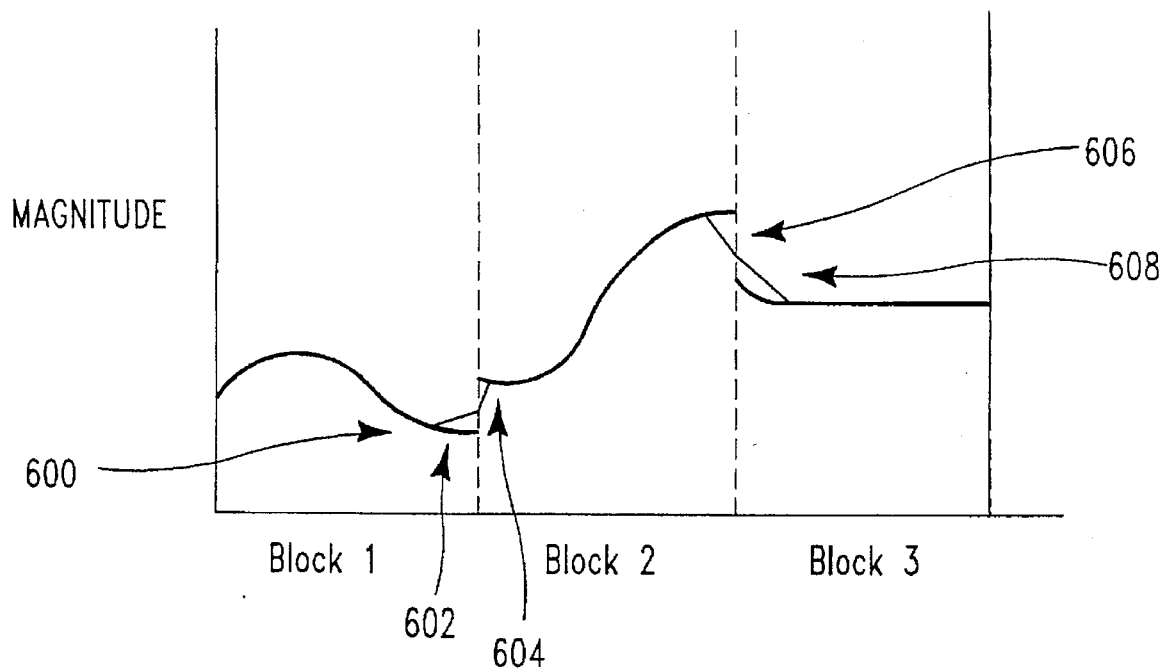

Referring now to FIG. 6, the application of the above described filtering method to the luminance blocks of FIG. 5 is illustrated. Reference numeral 600 is used to indicate the area that defines the maximum slew rate for block 1. Reference numeral 602 indicates the transitional region between Block 1 and Block 2 where the discontinuity is connected, in accordance with the present invention, using the magnitude of the maximum slew rate of Block 1. Similarly reference numeral 604 is used to illustrate the area of discontinuity in Block 2 that is connected to Block 1 using the magnitude of the maximum slew rate of Block 2.

Reference numerals 606 and 608 correspond to the transitional regions between Blocks 2 and 3. As illustrated the discontinuity between Block 2 and Block 3 is connected using the magnitude of the maximum slew rate in Block 2 in the region of Block 2 identified by the reference number 606 and by using the magnitude of the maximum slew rate in Block 3 in the region of Block 3 identified by reference numeral 608.

The second filtering method of the present invention which is based on the use of the slew rate of the luminance and/or chrominance components of a block is similar in result to that of the first filtering method described above with reference to FIG. 6. However, in accordance with the second filtering method of the present invention, instead of determining the maximum slew rate within a block by measuring the slew rate of the decoded video signal, maximum slew rate is determined analytically from the magnitude and matrix position of the IDCT coefficients of each block being processed. This embodiment while providing results similar to the first method described above may be simpler and therefore less costly to implement than the first method.

The third filtering method of the present invention which is based on the slew rate of the luminance and/or chrominance components of a block will now be described with reference to FIG. 7. Filtering method 3 is similar to filtering method 1, in that slew rate is determined by, e.g., measuring the slew rate of the decoded video signal.

However, the third filtering method of the present invention doesn't use the magnitude of the maximum slew rate measured over an entire block to connect the discontinuous blocks, but just the magnitude of the maximum slew rate measured in a localized region near the boundary between the blocks. The size of the localized region may be application dependent but should generally be less than 50% of the block.

Figure 7:
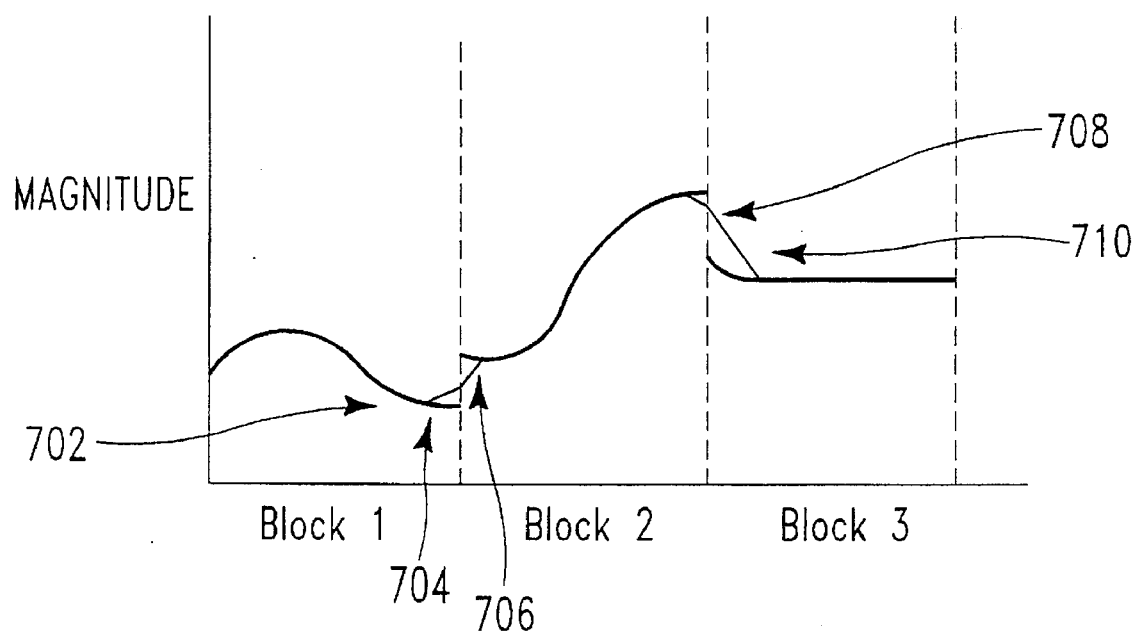
FIGS. 6 and 7 illustrate the effect of various filtering methods of the present invention on the signal illustrated in FIG. 5.

Use of the third filtering method of the present invention on Blocks 1, 2 and 3 of FIG. 5, is illustrated in FIG. 7. A ¼ block region is used for purposes of measuring the maximum slew rate of interest within a block for the example shown in FIG. 7.

The maximum slew rate for the last ¼ of Block 1 is found at the point illustrated by reference numeral 702. The magnitude of this measured slew rate is used in the region indicated by reference numeral 704 to connect the discontinuity between Block 1 and Block 2 within Block 1. In accordance with this method the magnitude of the maximum slew rate of the first 25% of Block 2 is used to connect the discontinuity between Block 1 and Block 2 in the region of Block 2 indicated by reference numeral 706. Similarly, the discontinuity in the region indicated by reference numeral 708 is connected using the magnitude of the maximum slew rate measured in the last 25% of Block 2 while the discontinuity in the region indicated by reference numeral 710 is connected using the magnitude of the maximum slew rate of the first 25% of Block 3.

What is claimed is:

1. A method of operating a video decoder, comprising the steps of:

receiving encoded digital video data, the encoded video data representing blocky and non-blocky predictively coded video frames and including motion vectors required for the decoding of the encoded video data;

monitoring the received encoded digital bitstream to identify the motion vectors required for the decoding of the encoded video data;

identifying video data corresponding to blocky video frames by detecting motion vectors, indicative of blocky video frames, that are larger than a preselected minimum size; and decoding the received encoded video data using the motion vectors included in the received encoded video data, the decoding step including the step of performing a blockiness reduction operation on video frames which are decoded using detected motion vectors that are larger than the preselected minimum size.

2. A method of operating a video decoder, comprising the steps of:

receiving an encoded digital bitstream including encoded digital video data corresponding to blocky and non-blocky video images, the encoded digital video data corresponding to blocky and B non-blocky predictively coded video frames, each predictively coded video frame including intra-coded blocks and predictively coded blocks required for the decoding of the encoded video data;

monitoring the received encoded digital video data to identify the intra-coded blocks; and identifying video data corresponding to blocky video images by detecting video data corresponding to predictively coded video frames that include more than a preselected minimum percentage of intra-coded blocks.

3. A method of operating a video decoder comprising the steps of:

receiving encoded digital video data corresponding to blocky and non-blocky video images, the encoded video data including blocks of video data required for the decoding of the encoded video data, each block corresponding to an array of pixels;

monitoring the received encoded digital video data to identify the blocks of video data required for the decoding of the encoded video data;

identifying video data corresponding to blocky video images by using information included in the blocks of video data to calculate a blockiness cost function using pixel differences at block boundaries; and decoding the received encoded video data, the decoding step including the step of performing a blockiness reduction operation on the video data identified as corresponding to blocky video images.

4. The method of claim 3, wherein the blockiness cost function is calculated for at least three adjacent blocks, represented by the letters A, B, and C, block A, block B and Block C each representing an array of 8×8 pixels, and wherein the cost function is expressed using the following equation:

$$\text{Cost} = \sum_{Y=0}^{7} |A(0,Y) - B(7,Y)| + \sum_{X=0}^{7} |A(X,0) - C(X,7)|$$

where A(0,Y) refers to the (0,Y) pixels in the array of 8×8 pixels which comprise block A;

where B(7,Y) refers to the (7,Y) pixel in the array of 8×8 pixels which comprise block B;

where A(X,0) refers to the (X,0) pixel in the array of 8×8 pixels which comprise block A; and where C (X,7) refers to the (X,7) pixel in the array of 8×8 pixels which comprise block C.

5. The method of claim 2, further comprising the steps of:

decoding the encoded digital video data to generate decoded video data; and processing the decoded video data generated by decoding the encoded digital video data identified as corresponding to blocky video images by performing a Gaussian low pass filter operation thereon.

6. The method of claim 2, further comprising the steps of:

decoding the encoded digital video data to generate decoded video data including blocks having block boundaries; and processing the decoded video data generated by decoding the encoded digital video data identified as corresponding to blocky video images by performing a low pass filter operation across the block boundaries.

7. A method of operating a video decoder comprising the steps of:

receiving an encoded digital bitstream including encoded digital video data corresponding to blocky and non-blocky video images, the encoded video data including information required for the decoding of the encoded video data;

monitoring the received encoded digital bitstream to identify the information required for the decoding of the encoded video data;

using the information required for the decoding of the encoded video data to identify video data corresponding to blocky video images;

decoding the encoded digital video data to generate decoded video data including predictively coded blocks having blocking artifact boundaries located within the predictively coded blocks; and performing a blockiness reduction operation on at least a portion of the decoded video data by performing a low pass filter operation across the blocking artifact boundaries located within the predictively coded blocks.

8. A method of operating a video decoder comprising the steps of:

receiving an encoded digital bitstream including encoded digital video data corresponding to blocky and non-blocky video images, the encoded digital video data including blocks of video data, each block corresponding to an array of pixels;

monitoring the received encoded digital bitstream to identify encoded digital video data corresponding to blocky video images, the monitoring step including the step of:

calculating a blockiness cost function using pixel differences at block boundaries; decoding the encoded digital video data to generate decoded video data, the decoding step including the step of performing an IDCT operation on a block represented by DCT coefficients; and processing the decoded video data generated by decoding the encoded digital video data identified as corresponding to blocky video images by performing a blockiness reduction operation thereon, the blockiness reduction operation including the steps of: altering at least one DCT coefficient of the block; and calculating the IDCT for the block.

9. The method of claim 8, wherein the at least one DCT coefficient of the block is altered to minimize the blockiness cost function.

10. A method of processing video data representing predictively coded images and bi-directionally coded images that were generated by performing motion compensation on a video signal, the method comprising the steps of:

identifying video data corresponding to blocky video images by detecting motion vectors having a value exceeding a preselected minimum motion vector value indicative of blocky video images; and performing a blockiness reduction operation on the identified blocky video data when the preselected minimum motion vector value is exceeded.

11. A method of processing digital video data including predictively coded video frames represented by intra-coded and predictively coded blocks, the method comprising the steps of:

monitoring the number of intra-coded blocks in the predictively coded video frames;

identifying blocky predictively coded video frames by:
i. monitoring the number of intra-coded blocks in the predictively coded video frames; and
ii. detecting which ones of the predictively coded video frames include more than a preselected minimum number of intra-coded blocks, the detected predictively coded video frames; and performing a blockiness reduction operation on the detected predictively coded video frames.

12. A method of detecting and processing blocky video images in a series of encoded video images, the method comprising the steps of:

examining video images in the series of encoded video images to identify fade or scene changes indicative of blocky video images; and performing a blockiness reduction on the video images in which fade or scene changes are identified.

13. A method of performing a blockiness reduction operation on blocky decoded video data including predictively coded blocks having blocking artifact boundaries located within the predictively coded blocks, the method comprising the step of:

performing a filtering operation across the blocking artifact boundaries located within the predictively coded blocks of the blocky decoded video data.

14. The method of claim 13, wherein the filtering operation is a low pass filtering operation.

* * * * *